United States Patent
Wilson

(10) Patent No.: US 8,503,931 B2
(45) Date of Patent: *Aug. 6, 2013

(54) TUNEABLE NFC-ENABLED DEVICE

(75) Inventor: Robin Wilson, Cirencester (GB)

(73) Assignee: Broadcom Innovision Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,888

(22) Filed: Jun. 27, 2012

(65) Prior Publication Data

US 2012/0270499 A1    Oct. 25, 2012

Related U.S. Application Data

(63) Continuation of application No. 11/362,311, filed on Feb. 24, 2006, now Pat. No. 8,249,500.

(30) Foreign Application Priority Data

| Feb. 24, 2005 | (GB) | ................................ | 0503848.4 |
| Aug. 26, 2005 | (GB) | ................................ | 0517497.4 |
| Oct. 5, 2005 | (GB) | ................................ | 0520260.1 |

(51) Int. Cl.
 *H04B 5/00* (2006.01)
(52) U.S. Cl.
 USPC ........................... 455/41.1; 327/564; 235/451
(58) Field of Classification Search
 USPC ........ 235/451; 455/41.1, 41.2, 41.3; 327/564; 327/565; 340/572.1–572.7
 See application file for complete search history.

(56) References Cited

U.S. PATENT DOCUMENTS

| 6,317,027 | B1 * | 11/2001 | Watkins | ....................... 340/10.1 |
| 6,650,227 | B1 | 11/2003 | Bradin | |
| 7,881,665 | B2 | 2/2011 | Symons | |
| 8,249,500 | B2 | 8/2012 | Wilson | |
| 2002/0140500 | A1 | 10/2002 | Beigel et al. | |
| 2003/0057279 | A1 | 3/2003 | Uozumi et al. | |
| 2004/0061640 | A1 | 4/2004 | Cornic et al. | |
| 2004/0196605 | A1 * | 10/2004 | Dinn et al. | ..................... 361/91.1 |
| 2004/0203361 | A1 * | 10/2004 | Belcher et al. | ................ 455/41.2 |
| 2007/0026826 | A1 | 2/2007 | Wilson | |

FOREIGN PATENT DOCUMENTS

| GB | 2391315 A | 2/2004 |
| JP | 7225251 A | 8/1995 |
| JP | 2003/281492 A | 10/2003 |
| JP | 2004/287968 A | 10/2004 |
| WO | WO 99/39450 A1 | 8/1999 |
| WO | WO 2004/093249 A1 | 10/2004 |

(Continued)

OTHER PUBLICATIONS

Communication pursuant to Article 94(3) EPC for International Application No. PCT/EP2006/726358, European Patent Office, Munich, Germany, 5 pages, dated Jun. 30, 2008.

(Continued)

*Primary Examiner* — Ping Hsieh
(74) *Attorney, Agent, or Firm* — Sterne, Kessler, Goldstein & Fox P.L.L.C.

(57) ABSTRACT

An NFC-enabled device configured at least in part as an integrated circuit, the integrated circuit including a controller and a plurality of capacitors. The controller is operable to control one or more of the plurality of capacitors to vary an operating parameter of the NFC-enabled device.

21 Claims, 5 Drawing Sheets

FOREIGN PATENT DOCUMENTS

| | | |
|---|---|---|
| WO | WO 2004/098089 A1 | 11/2004 |
| WO | WO 2005/045744 A1 | 5/2005 |
| WO | WO 2005/045755 A2 | 5/2005 |
| WO | WO 2005/050530 A2 | 6/2005 |
| WO | WO 2005/074402 A2 | 8/2005 |
| WO | WO 2006/054070 A1 | 5/2006 |

OTHER PUBLICATIONS

English language Abstract of Japanese Patent Publication No. JP 7225251 A, European Patent Office, Espacenet Databse Worldwide (1995), 2 pages (listed as Document FP1 on the accompanying form PTO/SB/08a).

English language Abstract of Japanese Patent Publication No. JP2003/281492 A, European Patent Office, Espacenet Databse Worldwide (2003), 2 pages (listed as Document FP3 on the accompanying form PTO/SB/08a).

English language Abstract of Japanese Patent Publication No. JP 2004/287968 A, European Patent Office, Espacenet Databse Worldwide (2004), 2 pages (listed as Document FP5 on the accompanying form PTO/SB/08a).

International Search Report for GB Application No. GB 0520260.1, dated Jan. 30, 2006, DTI, 1 page.

International Search Report for International Application No. PCT/GB2005/004407, mailed on Feb. 22, 2006, European Patent Office, Rijswijk, Netherlands, 2 pages.

Preliminary Report on Patentability and Written Opinion of the International Searching Authority directed to related International Patent Application No. PCT/GB2005/004407, issued May 22, 2007, from the International Bureau of WIPO; 5 pages.

"Identification cards—Contactless integrated circuit(s) cards—Proximity Cards—Part 3: Initialization and anticollision," ISO/IEC 14443-3, International Standard, First Edition, Feb. 1, 2001; 58 pages.

"Identification cards—Contactless integrated circuit(s) cards—Vicinity integrated Circuit(s) Card, Part 1: Physical characteristics," ISO/IEC Final Committee Draft 15693-1, Jul. 15, 2000; 11 pages.

"Information technology—Telecommunications and information exchange between systems—Near Field Communication—Interface and Protocol (NFCIP-1)," First Edition, ISO/IEC 18092, Apr. 1, 2004; 66 pages.

"Information technology—Telecommunications and information exchange between systems—Near Field Communication Interface and Protocol-2 (NFCIP-2)," First Edition, ISO/IEC 21481, Jan. 15, 2005; 12 pages.

Non-Final Rejection dated Jun. 22, 2010 for U.S. Appl. No. 11/362,311, filed Feb. 24, 2006; 13 pages.

Final Rejection mailed Feb. 17, 2011 for U.S. Appl. No. 11/362,311, filed Feb. 24, 2006; 13 pages.

Non-Final Rejection mailed Aug. 2, 2011 for U.S. Appl. No. 11/362,311, filed Feb. 24, 2006; 13 pages.

Final Rejection mailed Dec. 22, 2011 for U.S. Appl. No. 11/362,311, filed Feb. 24, 2006; 13 pages.

Notice of Allowance mailed Apr. 27, 2012 for U.S. Appl. No. 11/362,311, filed Feb. 24, 2006; 11 pages.

"Identification cards—Contactless integrated circuit(s) cards—Proximity Cards, Part 1: Physical characteristics," ISO/IEC Final Committee Draft 14443-1, Apr. 15, 2000; 8 pages.

"Identification cards—Contactless integrated circuit(s) cards—Proximity Cards—Part 2: Radio frequency power and signal interface," ISO/IEC 14443-2, International Standard, First Edition, Jul. 1, 2001; 17 pages.

"Identification cards—Contactless integrated circuit(s) cards—Proximity Cards—Part 4: Transmission Protocol," ISO/IEC Final Committee Draft 14443-4, Mar. 10, 2000; 39 pages.

"Identification cards—Contactless integrated circuit(s) cards—Vicinity cards—Part 2: Radio Frequency power and signal interface," ISO/IEC Final Committee Draft 15693-2, Mar. 9, 1999; 16 pages.

"Identification cards—Contactless integrated circuit(s) cards—Vicinity cards—Part 3: Anti-collision and transmission protocol," ISO/IEC Final Committee Draft 15693-3, Mar. 10, 2000; 50 pages.

\* cited by examiner

TUNEABLE NFC-ENABLED DEVICE

CROSS REFERENCE TO RELATED APPLICATIONS

This application is a continuation of application Ser. No. 11/362,311, filed Feb. 24, 2006, which claims priority to United Kingdom patent application nos. GB0503848.4, filed Feb. 24, 2005, GB0517497.4, filed Aug. 26, 2005, and GB0520260.1, filed Oct. 5, 2005, each disclosure of which is hereby incorporated by reference in its entirety.

FIELD OF THE INVENTION

This invention relates to an NFC (Near Field Communications) device, and to apparatus incorporating such devices.

BACKGROUND OF THE INVENTION

Wireless non-contact communication systems have previously been proposed.

One such system is generally known as a near field RFID (Radio Frequency Identification) system, and employs a near field RFID tag and a near field RFID reader for reading information stored on the tag by means of magnetic field (H-field) inductive coupling between the reader and the tag. Near field RFID tags are referred to below as tags. Near field RFID readers are referred to below as readers. Readers and tags are together referred to below as RFID devices.

Such tags typically include an antenna, a controller and a memory (which may be part of the controller) in which information (for example information about the article to which the tag has been attached, control data or program data) is stored or may be stored.

For so-called passive RFID tags, a compatible reader uses a radio frequency (RF) signal (for example a signal at 13.56 MHz) to generate a magnetic field and when the antenna of the tag is in close proximity to the reader the magnetic field (H-field) generated by the reader is inductively coupled from the reader to the tag resulting in derivation and supply of power to the controller. Supply of power enables operation of the tag, for example enabling the tag controller to operate and access the memory and transmit information from the memory via the tag antenna to the reader. Transmission of information from the memory will be through modulation of the supplied magnetic field (H field). In this context a compatible reader is a reader operating at the same radio frequency as the tag and in accordance with the same communication protocols.

RFID readers typically include an antenna, controller, memory (which may form part of the controller), signal generator, modulator (for modulating a generated RF signal with data from either the controller and/or memory) and demodulator (for demodulating a modulated RF signal received from for example an RFID tag.

Illustrative RFID devices are described in various international standards, for example ISO/IEC 14443 and IASO/IEC 15693.

In addition to RFID devices of the types described above, it has also previously been proposed to provide so-called Near Field Communications (NFC) devices.

NFC devices, often referred to as NFC communicators (which two terms may be used interchangeably), are radio frequency non-contact communications devices that can communicate wirelessly with other NFC devices and/or RFID devices over relatively short ranges (for example a range in the order of several centimeters up to a maximum range of in the order of a meter or so). Communication is via inductive coupling of a magnetic field (H field) between the NFC communicator and a second NFC communicator or RFID device.

Illustrative NFC devices and systems are described in ISO 18092 and ISO 21481, and the operation of such NFC devices depends on whether they are operating as an "initiator" or a "target", and whether they are operating in a "passive communications mode" or an "active communications mode". As will be apparent from the following, the terms "passive" and "active" in the context of NFC devices do not have the same meaning as "passive" and "active" when used in the context of traditional RFID devices.

An initiator NFC device will generate an RF field and start communication. A target device will respond to receipt of an RF field from an Initiator NFC device. Response will be through modulation of the supplied RF field or through generation of a new RF signal and modulation of that RF signal.

In a "passive communications mode" the Initiator NFC Device will generate an RF field and the Target NFC device will respond to an Initiator command by modulation of the received RF signal, usually by load modulation. In an "active communications mode both the Initiator FC device and the Target NFC Device use their own RF field to enable communication.

It will be apparent from the foregoing that a first NFC device can operate in a passive mode (in a manner akin to a conventional RFID tag) and use an RF field generated by a conventional RFID reader or a second NFC device to respond to that reader or second NFC device. Alternatively, the first NFC device can operate in an active mode to generate an RF field for interrogating a conventional RFID tag or for communication with a second NFC device that may be operating in a passive or an active mode (i.e. either by using the RF field generated by the first device to communicate with the first device or by generating its own RF field for communication with the first device).

This allows such NFC devices to communicate with other NFC devices, to communicate with RFID tags and to be 'read' by RFID readers.

NFC devices may be in stand-alone form (either hand-held or free-standing) or comprised within other apparatus (either in stand-alone form or by being integrated within the other apparatus), for example a mobile transceiver (such as a mobile telephone), a personal digital assistant (PDA), an item of computer equipment such as a personal or portable computer, or a vending machine. NFC devices can be implemented by means of a single integrated circuit (a so-called one-chip solution or system on chip) or alternatively by means of separate functional component parts or separate integrated circuits. Such apparatus is referred to variously herein as NFC communications enabled devices, NFC Communicators, host apparatus and host devices.

All NFC devices are designed to communicate within a particular range or field of operation, for example a few centimeters. It is important to ensure both consistency of operation and optimal range for any given NFC device. The range of operation can be affected by a variety of environmental factors, for example the presence of magnetic materials in close proximity to the NFC device, the host apparatus within which the NFC device is comprised (for example the position of the battery within the host apparatus), the application for which the NFC device is intended (for example whether the environment is a controlled environment or variable), and human contact with the device. To reduce any effect on range NFC devices are designed to be tuned, for example by selecting appropriate external component values (for example by addition of capacitors), to compensate for impedance effects in a non-tuned antenna arrangement. This necessity to tune NFC devices is exacerbated where the NFC device is intended for use within a series of host apparatus or variants of host apparatus. For example where the NFC device has been designed for use in a given manufacturer's range of mobile phones (cell phones), and it is desired to avoid having to use different NFC devices for each mobile phone in the range of mobile phones offered by that manufacturer, the NFC device will need to be tuned specifically to each mobile phone in the range. This tuning is expensive and drives down the number of devices produced per unit time, drives up the unit cost of each device, and ultimately adversely affects the profitability of the manufacturing enterprise. Furthermore, even once tuned for the host apparatus, the NFC device capacitance is fixed and therefore the NFC device operation may still be affected by changes in the external environment.

This tuning issue has previously been addressed either by modifying the NFC device to include internal capacitors (i.e. capacitors within the NFC circuitry) in series or parallel with the antenna of the NFC device, or by modifying the device to include appropriate contacts for connection to external capacitors (i.e. capacitors external to the NFC circuitry).

In both cases, RFID devices have tended to incorporate conventional flat-plate-construction capacitors (such as poly-poly or metal-insulator-metal or vari-cap diodes capacitors and other well known equivalents) formed during integrated circuit manufacture. These capacitors have tended to be formed from electrodes on different layers or planes and as a result have a fixed breakdown voltage determined by the extent of gap between the different layers or planes. Thus where higher breakdown voltages are required (for example during power derivation or in NFC devices) further capacitors are required (either internal or external) which increases silicon area, and therefore cost, and reduces design flexibility.

In addition existing RFID devices require 'tuning' i.e. selection of appropriate capacitance values following manufacture and/or integration into a host apparatus. Such tuning adds to the overall manufacturing process and hence affects the profitability of the process for the manufacturer. The tuning process is also time consuming and has to be done for each product and each new product variant.

It would therefore be highly advantageous if a tuneable NFC device could be devised that addressed some or all of these problems and thereby provided a manufacturer with the ability to increase the platform insensitivity of such devices, for example by facilitating adaptation of devices for different customer applications. One object of the present invention is to provide such a device. It would also be desirable if a device could be devised that enabled compensation of external factors that might otherwise influence proper operation of the device.

Furthermore it would also be desirable if the circuitry employed for such a device were to address the problems that have hitherto affected internal and external solutions, and another aim of the present invention is to provide such a circuit arrangement.

BRIEF SUMMARY OF THE INVENTION

In pursuit of these and other objects, a preferred embodiment of the present invention provides an NFC device configured at least in part as an integrated circuit, said integrated circuit comprising a controller, a plurality of capacitors and a plurality of switches associated with said capacitors, said controller being operable to control said switches to switch one or more of said plurality of capacitors into or out of said integrated circuit thereby to vary an operating parameter of said NFC device.

Another embodiment of the present invention provides an NFC device configured at least in part as an integrated circuit, said integrated circuit comprising first and second conductive track portions provided on a common layer of said integrated circuit, said first and second track portions being spaced from one another to form, respectively, first and second electrodes of a capacitor. The first electrode and the second electrode may be interleaved one with the other.

In another arrangement, the first and said second electrodes each include a plurality of transversely extending spaced conducting tabs, said first and second electrodes being arranged such that the tabs of said first electrode are interleaved with the tabs of said second electrode. The NFC device may further comprise an inductive coupler configured to inductively couple a magnetic field to or from other NFC or RFID devices. The inductive coupler may be integrated within said integrated circuit or external to said integrated circuit. The inductive coupler may comprise an electric-field antenna or a coil.

The NFC device may include a controller or processor and/or an interface to a controller or processor (for example within a host apparatus). The NFC device may also comprise a plurality of capacitors, each said capacitor comprising first and second conductive track portions provided on a common layer of said integrated circuit, said first and second track portions being spaced from another to form, respectively, first and second electrodes of a capacitor, said first electrode and said second electrode being interleaved one with the other, said controller or processor being configured to select a combination of said plurality of capacitors to modify an operating parameter (e.g. an induced voltage or an induced current) of said NFC device for tuning the NFC device.

In a modification of this arrangement, one or more of said plurality of capacitors comprises an array of capacitors and associated switches, said controller being configured to operate combinations of said switches to switch combinations of associated capacitors into or out of said integrated circuit to thereby improve an operating parameter of said NFC device for tuning said NFC device. In such a case, the array may comprise a binary-weighted array. Furthermore, the switches may comprise a transistor (such as a FET) or micro-mechanical switch mechanism.

In another embodiment, the NFC device may additionally comprise third and fourth conductive track portions provided in a second common layer of said integrated circuit that is different to the common layer in which said first and second track portions are provided and which is spaced therefrom by an insulating layer, said third and fourth track portions being spaced from one another to form, respectively, first and second electrodes of a second capacitor, said first electrode and said second electrode of said second capacitor being interleaved one with the other. In this embodiment, the first and second capacitors may be arranged one above the other and be electrically coupled together in parallel. For example said first electrode of said first capacitor may be coupled to said first electrode of said second capacitor, and said second electrode of said first capacitor may be coupled to said second electrode of said second capacitor, and said first and second capacitors may be arranged one above the other such that laterally extending tabs of said first capacitor overlie laterally extending tabs of said second capacitor. In another arrangement, a plurality of additional capacitor electrode pairs may be provided on other common layers.

As will become apparent, the scope of the present invention extends to encompass apparatus, such as a mobile transceiver, comprising an NFC device as specified herein. Other illustrative host apparatus (without limitation) include a personal digital assistant (PDA), an item of computer equipment such as a personal or portable computer, or a vending machine. In such apparatus functionality of the NFC device may be shared or comprised within the host apparatus, for example the NFC device may interface directly to the host apparatus processor which controls operation of the NFC device.

In another arrangement there is provided an NFC device comprising an inductive coupler, a controller and a plurality of capacitors electrically coupled between the inductive coupler and the controller, each said capacitor comprising first and second conductive track portions provided on a common layer of an integrated circuit, said first and second track portions being spaced from another to form, respectively, first and second electrodes of a capacitor, said controller or processor being configured to select a combination of said plurality of capacitors to modify an operating parameter of said NFC device for tuning the NFC device. In another arrangement said first electrode and said second electrode may be interleaved one with the other for one or more of said plurality of capacitors.

In this embodiment the controller and said plurality of capacitors may be provided on an integrated circuit that is electrically coupled to the inductive coupler. In a modification, the inductive coupler may be part of said integrated circuit.

Preferably, one or more of said plurality of capacitors comprises an array of capacitors and associated switches, said controller being configured to operate combinations of said switches to switch combinations of associated capacitors into or out of said integrated circuit to thereby improve an operating parameter of said NFC device for tuning said NFC device.

In accordance with a further embodiment of the present invention, there is provided a method of tuning an NFC device comprising: providing an NFC device that includes an inductive coupler, a controller or processor and a plurality of capacitors, and controlling said controller or processor to couple between said coupler and said controller or processor a combination of said capacitors that optimises an operating parameter of said NFC device.

In another arrangement the NFC device may comprise a sensor that is capable of measuring the strength of a magnetic field generated by the NFC device, said sensor being configured to generate a feedback signal that is passed to the NFC device controller and indicates the sensed magnetic field strength, said controller controlling the plurality of capacitors to optimise an operating parameter of the NFC device.

Other features, objects and advantages of the present invention will be apparent to those persons of ordinary skill in the art.

BRIEF DESCRIPTION OF THE DRAWINGS/FIGURES

Various presently preferred embodiments of the invention will now be described, by way of illustrative example only, with reference to the accompanying drawings, in which.

Figure 4A:
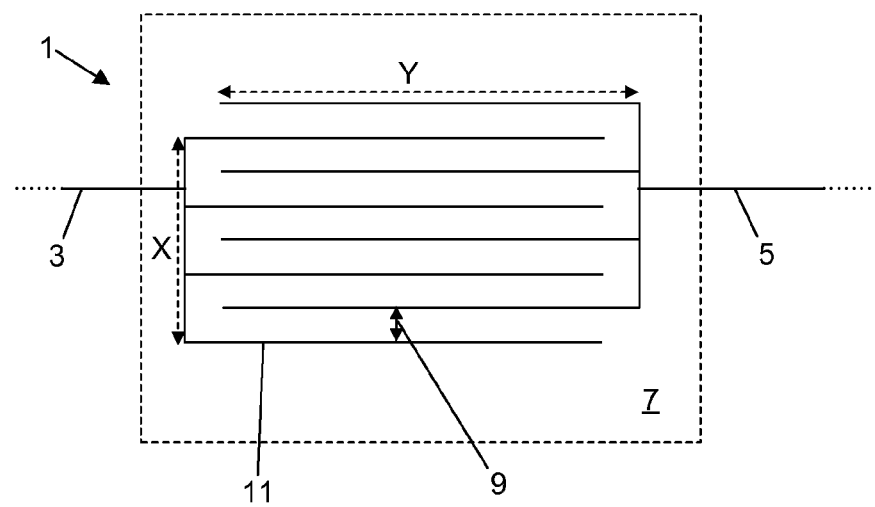
Figure 4B:
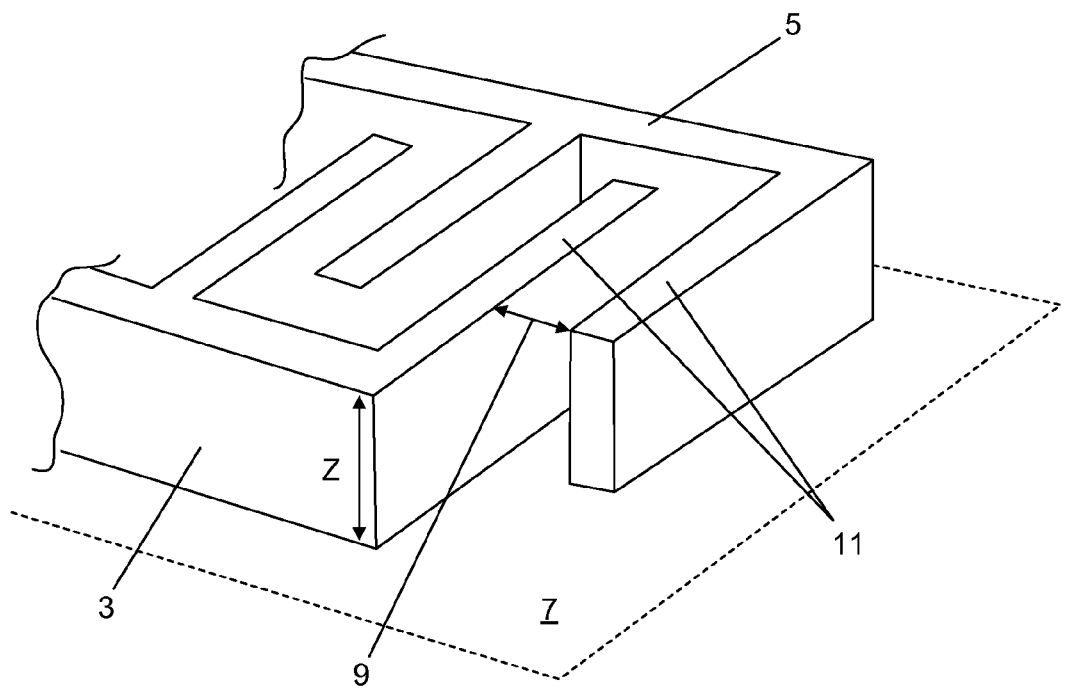
Figure 5:
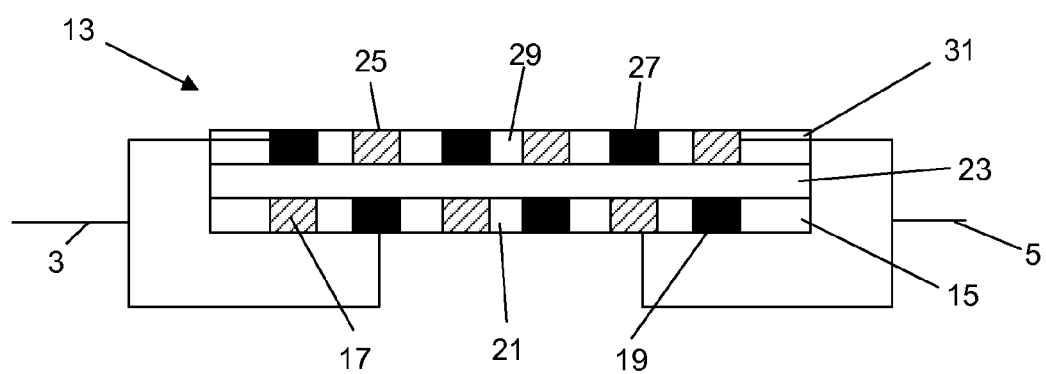

FIGS. 4a and 4b are schematic plan and perspective representations of a capacitor of an NFC device configured as an integrated circuit in accordance with a preferred embodiment of the invention; and FIG. 5 is a schematic representation in cross-section of a particularly preferred capacitor of an NFC device wherein a plurality of capacitors in accordance with the embodiment depicted in FIGS. 4a and 4b have been formed on discrete separated layers of an integrated circuit.

DETAILED DESCRIPTION OF THE INVENTION

Figure 1:
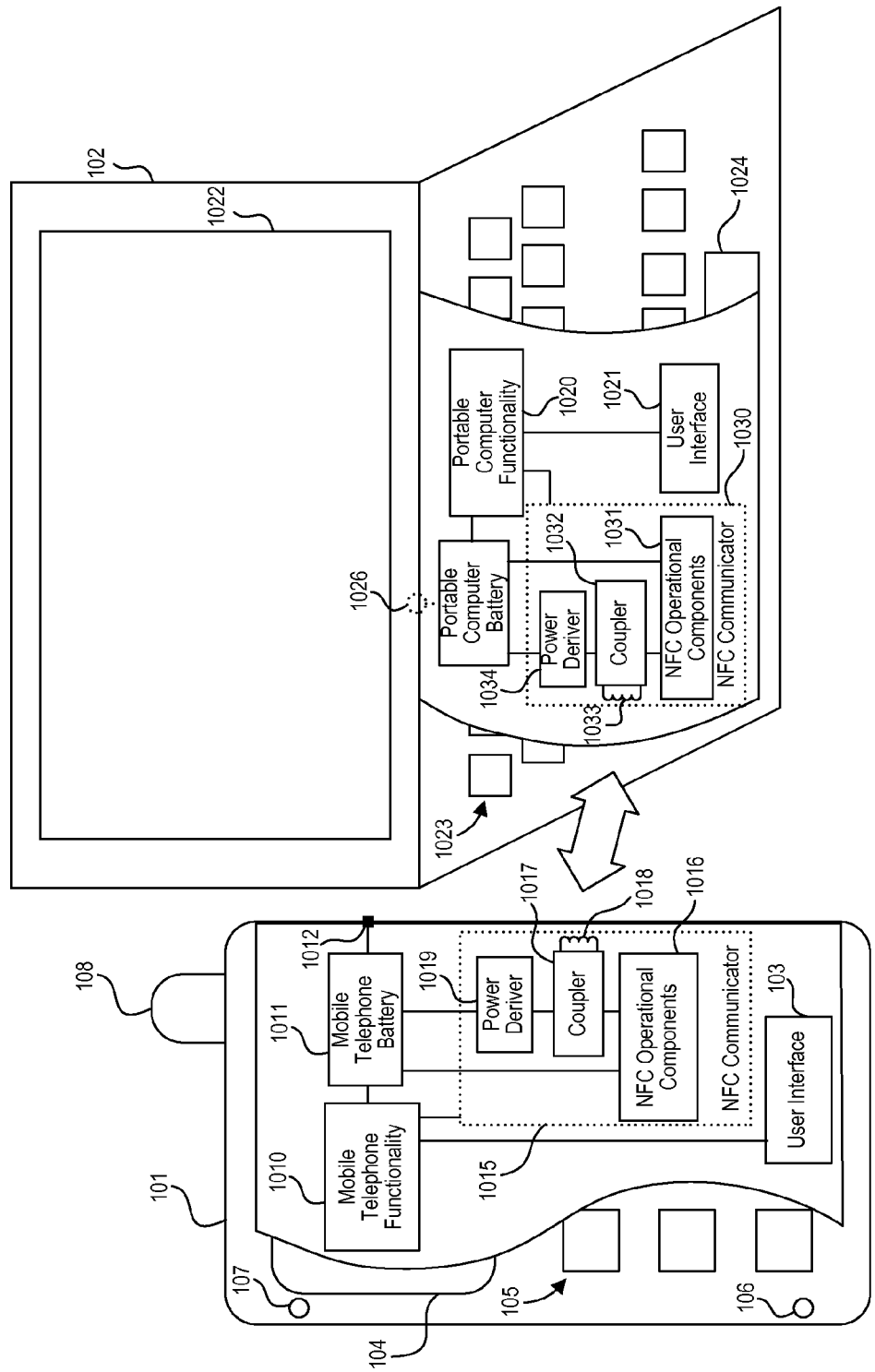
FIG. 1 is a schematic representation of two NFC communications enabled devices engaged in a communications session.

Referring now specifically to FIG. 1, there is shown a schematic representation of two NFC communications enabled devices and the communications session between them. In FIG. 1 the representations of the NFC communications enabled devices have been show, partly cut-away and the functionality provided by the NFC communications enabled devices has been illustrated by way of a functional block diagram within the NFC communications enabled devices.

As shown in FIG. 1, one illustrative NFC communications enabled device comprises a mobile telephone (cellphone) 101 and the other illustrative NFC communications enabled device comprises a portable computer 102 such as a notebook or laptop computer.

The mobile telephone 101 has the usual features of a mobile telephone including mobile telephone functionality 1010 (in the form of, usually, a programmed controller, generally a processor or microprocessor with associated memory or data storage, for controlling operation of the mobile telephone in combination with a SIM card), an antenna 108 for enabling connection to a mobile telecommunications network, and a user interface 103 with a display 104, a keypad 105, a microphone 106 for receiving user voice input and a loudspeaker 107 for outputting received audio to the user. The mobile telephone also has a chargeable battery 1011 coupled to a charging socket 1012 via which a mains adapter (not shown) may be connected to enable charging of the battery 1011. The mobile telephone 101 may have an alternative or additional power supply (not shown), for example a reserve battery or emergency battery.

Similarly the portable computer 102 has the usual features of a portable computer including portable computer functionality 1020 in the form of, usually, a processor with associated memory in the form of ROM, RAM and/or a hard disk drive, one or more removable media drives such as a floppy disk drive and/or a CDROM or DVD drive, and possibly a communications device for enabling the portable computer to connect to a network such as an Internet. The portable computer 102 also includes a user interface 1021 including a display 1022, a keyboard 1023 and a pointing device, as shown a touchpad 1024.

The portable computer 102 also has a chargeable battery 1025 coupled to a charging socket 1026 via which a mains adapter (not shown) may be connected to enable charging of the battery 1025.

In addition, as shown in FIG. 1, both NFC communications enabled devices 101 and 102 have an NFC device 1015 and 1030. As shown, the NFC devices 1015 and 1030 are incorporated within the larger devices and, as with the other functional blocks, may be discrete entities within the host devices or may be provided by features dispersed throughout or integrated within the host device or a part of the host device.

Each NFC device 1015 and 1030 comprises NFC operational components 1016 and 1031 for, as will be described below, enabling control of the NFC functionality and generation, modulation and demodulation of an RF signal. Each NFC communicator 1015 and 1030 also comprises a coupler 1017 and 1032 comprising an inductor or coil in the form of an antenna 1018 and 1033. The couplers 1017 and 1032 enable an alternating magnetic field (H field) generated by the antenna 1018 (or 1033) of one NFC Device 1015 (or 1030) by transmission of an RF signal (for example a 13.56 megahertz signal) to be inductively coupled to the antenna 1033 (or 1018) of the other near field communicator 1030 (or 1015) when that antenna is within the field of the RF signal generated by the one NFC device 1015 (or 1030).

The NFC devices 1015 and 1030 are coupled to the mobile telephone and portable computer functionality 1010 and 1020, respectively, to enable data and/or control commands to be sent between the NFC device and the host device and to enable user input to the NFC device. Communication between the user interface 103 or 1021 and the NFC device 1015 or 1030 is via the host device functionality 1010 or 1020, respectively.

Each of the NFC devices 1015 and 1030 has a power provider 1019 and 1034. The power providers 1019 and 1034 may be, for example, batteries such as button cell or other small batteries. Alternatively or additionally, as shown by the dashed lines in FIG. 1, the power providers 1019 and 1034 may comprise couplings to the host batteries 1011 and 1025 and/or may be coupled to derive power from an RF signal inductively coupled to the NFC device.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device.

Also, rather than being incorporated within the host device, the NFC device 1015 or 1030 may be associated with the host apparatus, for example by a wired or wireless coupling that is capable of power transfer. In such a case, a housing of the NFC device may be physically separate from or may be attached to the housing of the host device; in the later case, the attachment may be permanent once made or the NFC device may be removable. For example, the NFC device may be housed within: a housing attachable to another device; a housing portion, such as a casing of the host apparatus; an access card; or may have a housing shaped or configured to look like a smart card. For example an NFC device may be coupled to a larger device by way of a communications link such as, for example, a USB link, or may be provided as a card (for example a PCMCIA card or a card that looks like a smart card) which can be received in an appropriate slot of the larger or host device.

As another possibility, the NFC device may be a standalone NFC device, that is it may have no functionality beyond NFC communication.

Figure 2:
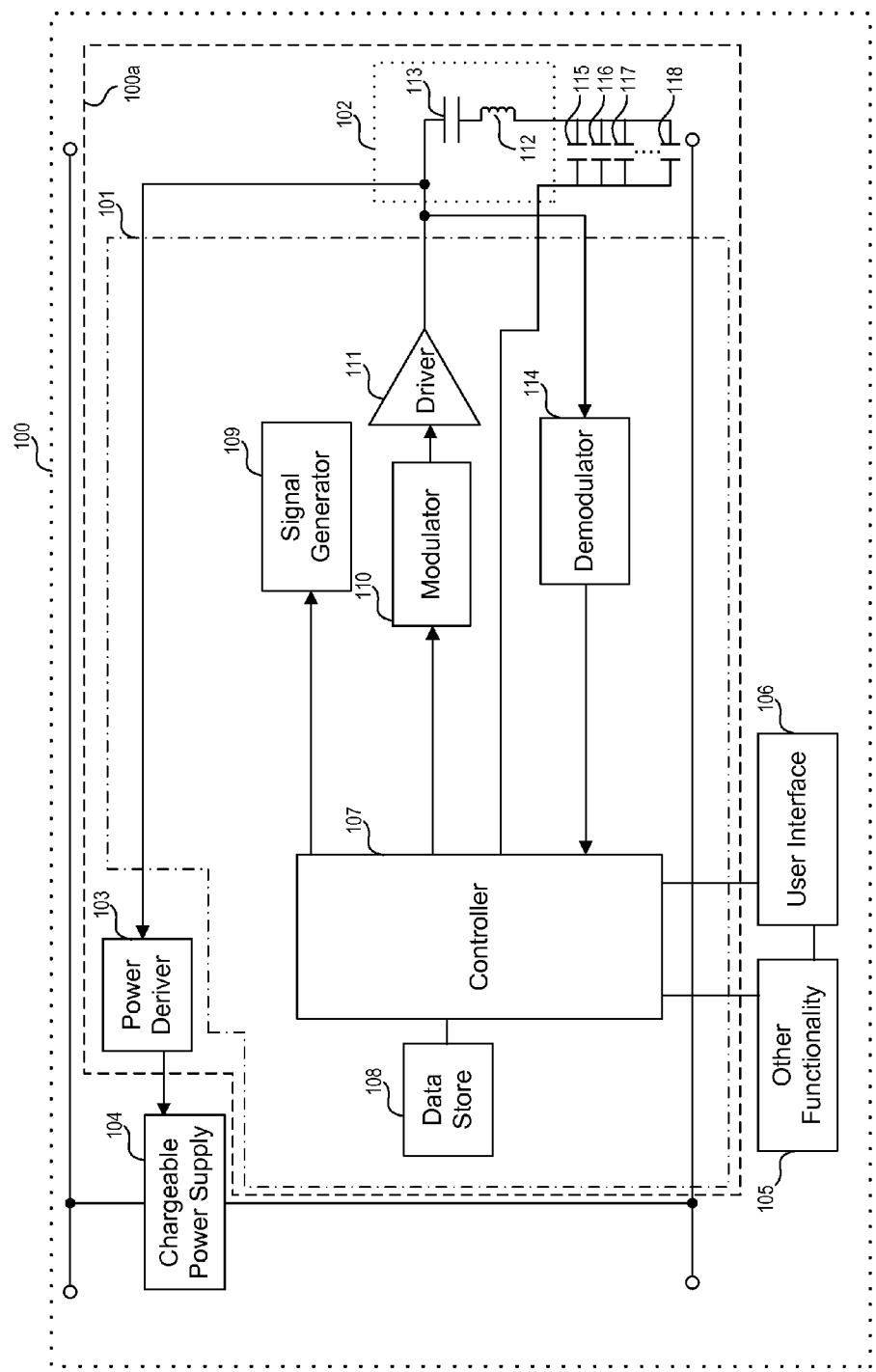
FIG. 2 is a schematic representation of an NFC device in accordance with a preferred embodiment of the invention.

Referring now to FIG. 2 of the accompanying drawings, FIG. 2 is a functional block diagram of an apparatus 100 comprising an NFC device, and illustrates in greater detail one way in which the NFC operational components of an NFC device embodying the invention may be implemented.

In this example, the apparatus 100 comprises an NFC device 100a having NFC operational components 101, an inductive coupler 102, and a power deriver 103 coupled between the coupler 102 and a chargeable power supply 104 chargeable by the power deriver 103. The NFC communications enabled device 100 may or may not also have or be capable of being connected or coupled with at least one of other functionality 105 (for example functionality of the host apparatus such as described above for FIG. 1) and a user interface 106.

The NFC operational components 101 comprise a controller 107 for controlling overall operation of the NFC communicator. The controller 107 is coupled to a data store 108 for storing data (information and/or control data) to be transmitted from and/or data received by the NFC communications enabled device. The controller 107 may be a microprocessor, for example a RISC processor or other microprocessor or a state machine. Program instructions for programming the controller and/or control data for communication to another near field RF communicator may be stored in an internal memory of the controller and/or the data store 108.

The NFC operational components 101 also comprise a demodulator 114 coupled between the coupler 102 and the controller 107 for demodulating a modulated RF signal inductively coupled to the coupler 102 and for supplying the thus extracted data to the controller 107 for processing.

In addition the NFC operational components 101 include components for enabling modulation of an RF signal to enable data to be communicated to another RFD device in near field range of the NFC device 100a.

As shown in FIG. 2, the NFC operational components 101 comprise a modulator 110 coupled via a driver 111 to the coupler 102. The modulator 110 may, for example, switch a transistor (for example a FET) coupled across the inductor 112 on and off in accordance with the data supplied by the controller 107, thereby modulating the load on the inductor 112 and thus an RF signal supplied by the NFC communicator in accordance with that data. Alternatively or additionally modulation of an RF signal may be provided by sine synthesis (which for example may generate a PDM (Pulse Density Modulation) signal to the driver 111). As a further alternative the NFC communicator may comprise an emulator intended to enable interference or simulated load modulation of a received RF signal as described in greater detail in WO 2005/045744, the whole contents of which are hereby incorporated by reference. In this latter case, the signal generator is replaced by the circuitry described in WO 2005/045744 that enables interference or simulated load modulation of a received RF signal.

When an NFC communicator as shown in FIG. 2 is in initiator mode (and therefore is transmitting an RF signal), the controller 107 is configured to control the modulator and signal generator to transmit a modulated or un-modulated RF signal through driver 111. Modulation will be in accordance with at least one of data held in data store 108 and control data held within controller 107. The data communicated will depend upon the communications protocol under which the NFC communicator is operating and the data stored in the data store 108. For example, the initial data communicated may be a wake-up instruction (for example REQA) to any receptive device (for example an NFC communicator in target mode or an RFID transponder) in near field range.

When an NFC communicator as shown in FIG. 2 is operating in target mode, it will wait to receive an RF signal from an initiator mode NFC communicator or RFID reader through the coupler 102. On receipt of such an RF signal, the demodulator 114 will demodulate the RF signal to extract any data carried by the RF signal and will supply a digital data signal to the controller 107. The demodulated signal may be, for example, a wake-up instruction (for example REQA). The controller 107 will respond to such received data in accordance with its programming and /or data stored in the data store 108. Response in target mode may be through load modulation of the received RF signal (through modulation of load on inductor 112). Alternatively certain NFC communicators may respond through interference with the received RF signal or alternatively through transmission of a modulated RF signal (as described above).

As set out above, the NFC communications enabled device shown in FIG. 2 has its own chargeable power supply 104 (which may be part of the NFC communicator or may be the power supply of a host device) and when that chargeable power supply 104 is drained or is not fully charged, the power deriver 103 of the NFC communications enabled device may derive power from any suitable RF signal within near field range of the coupler 102 so as to charge the chargeable power supply 104. A suitable RF signal may be for example an RF signal supplied by another NFC communications enabled device or near field RF communicator (for example an RFID reader or an RFID tag if the tag is capable of supplying sufficient power).

The functionality of the controller 107 is shown in FIG. 2 as being entirely within the NFC communicator. As other possibilities, the functionality of the controller 107 may be entirely within any host device controller or distributed between the NFC communicator and the host device. As a further possibility, certain control functionality may reside within a separate unit which is attachable or removable or alternatively only used for certain transactions, for example a security device or ESD device which may only be used for payment transactions. Where the functionality of the controller 107 is within a separate unit or within any host device, then instead of the controller 107 the NFC communicator will have a coupling, possibly including an appropriate interface, to that controller.

In the example shown in FIG. 2, the coupler 102 comprises a series connection to earth (ground) of a capacitor 113 and an inductor 112. As another possibility a parallel circuit configuration may be used. The exact design of the inductor and inductive coupler will depend on the functionality, range and emission standard compliance requirements, plus the environment within which the NFC communications enabled device 100 is designed to operate.

The NFC device 100a of FIG. 2 additionally comprises a plurality of capacitors 115 to 118 under control of the controller 107. The plurality of capacitors 115-118 may be in the form as described in more detail below i.e. each capacitor being formed on a single common layer of the integrated circuit and comprising first and second interleaved electrode tabs or optionally may be comprised of standard capacitors, for example flat plate construction capacitors (e.g. poly-poly capacitors) or vari-cap diodes. The controller 107 in FIG. 2 directly controls which capacitors or combination of capacitors are active during operation of the NFC device 100a either via a switch or series of switches (as will be described below in connection with FIG. 5), or by varying a DC bias in the case of for example vari-cap diodes.

The controller 107 may be programmed on manufacture of the NFC device or host apparatus as a result of testing of the NFC device and the manufacturer establishing the required performance and a set capacitance value or range of capacitance values to provide that level of performance. For example on programming of the NFC device, the controller 107 may also be programmed to require a particular series of capacitors to operate or be switched on at particular times. Only one capacitance may be selected and controlled by the controller 107. Alternatively different capacitances may be selected for different operation conditions, for example when the NFC device is acting as an initiator or target or when for example the controller 107 receives a particular control or program signal from its host apparatus. Such a program or control signal may be sent by the host apparatus following attachment of a new battery or casing or other removable or replaceable attachment to the host apparatus. Such a system will achieve platform insensitivity but will still be sensitive to environmental changes which are not under the control of the host apparatus.

Optionally, the controller 107 may be arranged to control the capacitance in response to receipt of an internal or external signal to switch on or off the capacitors and therefore adjust the capacitance as required. Examples of an external signal may for example be receipt of an RF signal coupled to coupler 102, demodulation of the received RF signal and processing of control data so received. Examples of an internal signal may include the use of a magnetic field sensor within the NFC device which is located within the magnetic field being generated by the NFC device and which is able to sense the strength of that magnetic field. Where the magnetic field falls below a certain threshold value the magnetic field sensor sends a signal to the controller 107 which results in the controller 107 changing the capacitance of the circuit. Such a system will be sensitive to environmental changes. Such a magnetic field sensor is described in co-pending application PCT/GB2005/004407, the contents of which are hereby incorporated by reference in the present application.

The controller 107 may control capacitance in all of the ways described above or in a combination of the ways described above depending on the tuning or extent of platform insensitivity required.

Figure 3:
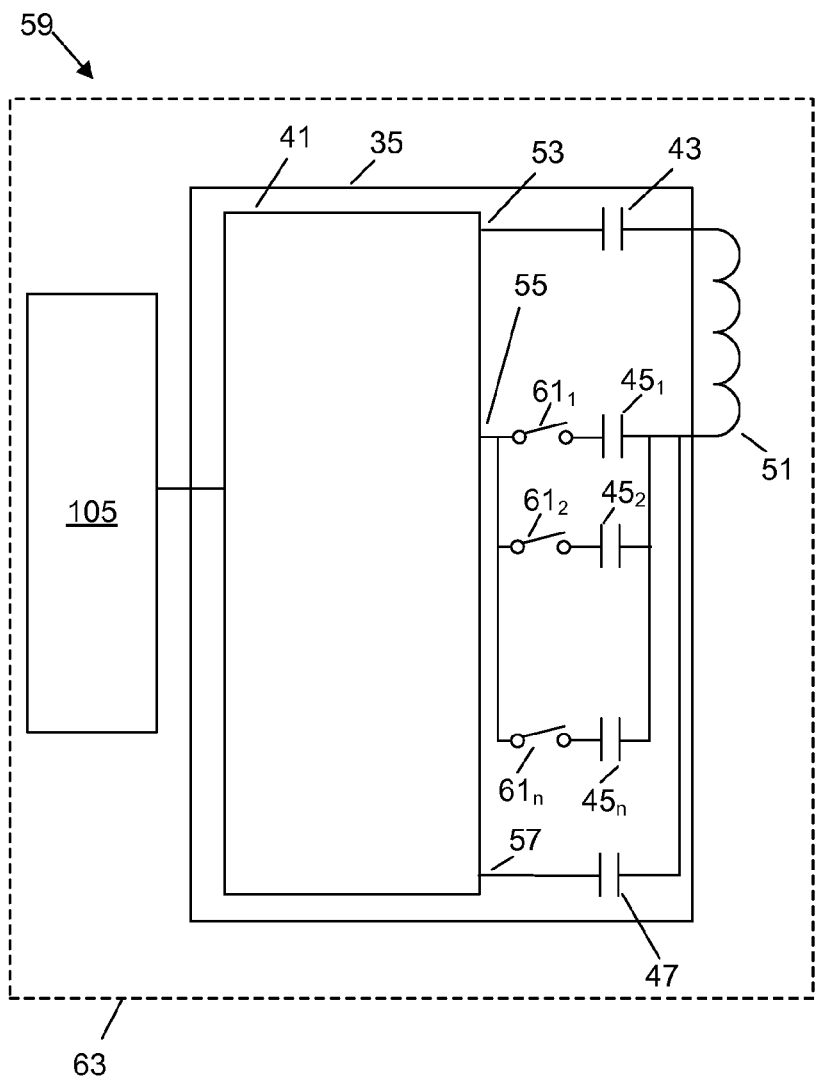
FIG. 3 is a schematic representation of another NFC device in accordance with a preferred embodiment of the invention.

Referring now to FIG. 3, the NFC device 59 is representative of the NFC apparatus 100 described in relation to FIG. 2 above. The NFC device functionality (referenced as 100a in FIG. 2) is represented by the box 35 plus inductive coupler 51 (referenced as 112 in FIG. 2). The specific functionality of the NFC device is not shown for ease of reference. The functionality of other system components is generally designated by box 105.

A principal difference between the arrangement of FIGS. 2 and 3 is that the plurality of capacitors 115-118 has been replaced by a plurality of capacitors $45_1$ to $45_n$ and associated switches $61_1$ to $61_n$. Each one of the plurality of capacitors $45_1$ to $45_n$ is selectively switchable into or out of the integrated circuit by the associated switches $61_1$ to $61_n$, and each of the switches may be formed by a FET transistor, a micromechanical mechanism, or any one of many other suitable alternatives well known to persons of ordinary skill in the art. The operation of the switches is controlled by the NFC device controller, and that control may be in any of the ways described above in relation to FIG. 2.

Such control is effected in one illustrative embodiment by choosing the values of the plurality of capacitors $45_1$ to $45_n$ so that a binary-weighted array is formed. In this way a processor or controller within the functional core 41 can execute an algorithm to adjust the capacitance value during manufacture or use and thereby the tuning for improved system performance, when for example the NFC device is to be used in one mobile phone variant rather than a second variant. As a result of instructions received from the host apparatus or during integration into the host apparatus the processor or controller executes the algorithm and adjusts the capacitance value accordingly. Likewise where an internal sensor (for example as described in co-pending application PCT/GB2005/004407) is included, the algorithm may be used to adjust the capacitance value in accordance with the magnetic field sensed by such internal sensor.

The aforementioned algorithm may be implemented by a microprocessor or microcontroller within the NFC device, or optionally the algorithm may be implemented by a host system (apparatus) processor. The advantage of this latter arrangement is that different host systems can automatically adjust the capacitance value and so allow for capacitance values specific to the host system in question. It is also the case that the NFC device of the present invention may be implemented as a stand alone device, or integrated within circuitry of a host system (generally designed by reference numeral 63 in FIG. 3).

Persons of ordinary skill in the art will be aware that many different algorithms may be employed to enable the aforementioned tuning of the device. For example the algorithm may implement a peak detection process whereby the capacitance is changed (e.g. increased or decreased) in increments until a point is reached where the last increment adversely affects the parameter, whereupon the increment immediately before the last increment represents an optimum setting for the circuitry. In another example, the algorithm may implement PID (proportional, integral, differential) processing. An example algorithm may be represented thus:

$$Output(t)=PE(t)+1/I\!\int\!E(t)dt+Dd/dt.E(t)$$

where t=time, E is the received RF signal strength or output from the aforementioned sensor, P is the proportional error, I is the integral of the error and D is the derivative of the error. Constants may be used to determine the effect that each of the three inputs (P, D and I) has on the combined comparison and therefore the effect on the control of the RF signal being generated.

Referring now to FIGS. 4a and 4b of the accompanying drawings, there are depicted a plan view and a partial schematic perspective view of a capacitor 1 for a preferred embodiment of an NFC device according to the present invention.

As depicted, the capacitor 1 is formed by first and second conductive track portions 3, 5 that form respective first and second electrodes of the capacitor 1. The track portions 3, 5 have been deposited on a common substrate layer 7 in such a way that a substantially constant gap 9 is left between the electrodes. In the finished device, the gap 9 may be filled by an insulator (dielectric), but for clarity the insulator has been omitted from FIGS. 4a and 4b.

As depicted, the first and second track portions 3, 5 are provided at spaced intervals along their length with a plurality of tab portions 11 that are arranged to extend laterally towards the other of the two track portions (i.e. the first track portion tabs extend towards the second track and the second track portions extend towards the first track). The first and second electrode tab portions are, as shown, interleaved or interdigitated with one another to form a comb-like arrangement. Whilst the capacitor of FIG. 4 is depicted as being comprised of only two electrodes, it will be appreciated by those persons of ordinary skill in the art that a large number of electrodes may alternatively be provided.

Track dimension X, tab dimension Y, and track spacing 9 are tailored, as will be appreciated by those persons skilled in the art, such that the capacitor provides a capacitance that is suitable for the particular NFC device that the capacitor is incorporated into. The capacitance, and as a result the breakdown voltage, is determined by the separation of the track spacing, the number of tracks incorporated, the dimensions of X and Y and the dielectric used. The person skilled in the art will ascertain the likely capacitance range or breakdown voltage required and in accordance with the teachings of the present invention, design the NFC device circuit accordingly.

As shown, it is highly preferred for the tracks to have a width that is the same as a width of the tabs and for first electrode tab dimension Y to be generally the same as second electrode tab dimension Y, as such an arrangement provides a generally constant capacitance per unit length over the full extent of the capacitor. It will be appreciated, however, that alternative configurations may be adopted if desired. Similarly, whilst both electrodes are depicted as being straight, they need not be so. They could, for example, be curved.

FIG. 5 is a schematic representation in cross-section of a particularly preferred integrated circuit wherein a plurality of capacitors in accordance with the embodiment depicted in FIGS. 4a and 4b have been formed on discrete separated layers of an integrated circuit.

Referring to FIG. 5, the capacitor 13 of this embodiment comprises, on a first common layer 15 of the integrated circuit, first and second interleaved electrode tabs 17, 19 spaced from one another by an insulator 21. An insulator layer 23 is provided on top of the first and second electrode tabs, and third and fourth electrodes (the tabs 25, 27 of which are shown) spaced by insulator 29 are provided on a second common layer 31 above the insulator layer 23. As shown, the first and third, and second and fourth electrodes are electrically connected in parallel, and the overall arrangement (which may be extended to include capacitors of a similar design on further layers) provides an improved capacitance per unit surface area of the integrated circuit. Such an arrangement also provides both for increased circuit design flexibility (as compared with those arrangements where the insulating layer thickness (and hence the capacitance) is fixed) and tuning ability within the NFC device.

Having now described several presently preferred embodiments of the present invention, it will be immediately apparent to those persons of ordinary skill in the art that modifications, additions and substitutions may be made without departing from the spirit of the invention or from the scope of the invention as set out in the claims.

It should also be noted that whilst certain presently preferred combinations of features have been explicitly enumerated in the accompanying claims, the scope of the invention is not limited to these combinations but instead extends to encompass any combination of features herein described irrespective of whether that particular combination has been claimed.

What is claimed is:

1. A near field communications (NFC)-enabled device, comprising:
    a magnetic field sensor configured to sense a magnetic field strength to provide a sensed field strength signal; and
    a controller configured to vary an operating parameter of the NFC-enabled device in response to the sensed field strength signal using a peak detection process, the controller being further configured to:
        change the operating parameter in a plurality of increments until a final increment adversely affects the operating parameter; and
        set the operating parameter to an increment immediately before the final increment;
    wherein the magnetic field sensor is further configured to generate the sensed field strength signal to cause the controller to vary the operating parameter when the magnetic field strength is less than a threshold.

2. The NFC-enabled device of claim 1, further comprising:
    a plurality of capacitors, coupled to the controller, at least one of the plurality of capacitors being configurable to be activated or deactivated by the controller to vary the operating parameter.

3. The NFC-enabled device of claim 2, further comprising:
a plurality of switches, each switch from among the plurality of switches being associated with at least one capacitor from among the plurality of capacitors,
wherein the controller is configured to control at least one of the plurality of switches to activate or deactivate its associated at least one capacitor to vary the operating parameter.

4. The NFC-enabled device of claim 2, wherein the at least one capacitor comprises:
first and second conductive track portions provided in a common layer of the NFC -enabled device, the first and second conductive track portions being spaced from one another to form, respectively, first and second electrodes of a first capacitor.

5. The NFC-enabled device of claim 4, wherein the first and second electrodes each include a plurality of transversely extending spaced conducting tabs, the first and second electrodes being arranged such that the plurality of transversely extending spaced conducting tabs of the first electrode are interleaved with the plurality of transversely extending spaced conducting tabs of the second electrode.

6. The NFC-enabled device of claim 4, further comprising:
third and fourth conductive track portions provided in a second common layer of the NFC-enabled device that is different from the common layer and which is spaced therefrom by an insulating layer, the third and fourth conductive track portions being spaced from one another to form, respectively, first and second electrodes of a second capacitor from among the plurality of capacitors.

7. The NFC-enabled device of claim 6, wherein the first electrode of the first capacitor is coupled to the first electrode of the second capacitor, and the second electrode of the first capacitor is coupled to the second electrode of the second capacitor, the first and the second capacitors being arranged one above the other such that laterally extending tabs of the first capacitor overlie laterally extending tabs of the second capacitor.

8. The NFC-enabled device of claim 2, wherein the plurality of capacitors comprises:
a fixed capacitor; and
a plurality of switchable capacitors in parallel with the fixed capacitor.

9. The NFC-enabled device of claim 1, wherein the operating parameter comprises at least one of:
an induced voltage; and
an induced current.

10. The NFC-enabled device of claim 1, wherein the controller is configured to implement the peak detection process using a proportional, integral, differential (PID) processing algorithm, the PID processing algorithm being represented by:

$$PE(t) + \frac{1}{I}\int E(t)d(t) + D\frac{d}{dt}E(t),$$

wherein t is a time, E is the sensed field strength signal, P is a proportional error, I is an integral of an error, and D is a derivative of the error.

11. The NFC-enabled device of claim 1, further comprising:
an inductive coupler;
wherein the controller is further configured to vary the operating parameter of the NFC-enabled device to vary a resonant frequency of the inductive coupler.

12. A method of operating a near field communications (NFC) -enabled device, comprising:
generating a magnetic field strength signal from a detected magnetic field near the NFC-enabled device when the magnetic field strength signal is less than a threshold;
adjusting a capacitance of a plurality of capacitors by a first increment to vary an operating parameter of the NFC-enabled device upon receipt of the magnetic field strength signal;
adjusting the capacitance of the plurality of capacitors by a second increment to vary the operating parameter; and
determining whether the second increment adversely affects the operating parameter when compared to the first increment.

13. The method of claim 12, further comprising:
adjusting the capacitance by the first increment when the second increment adversely affects the operating parameter.

14. The method of claim 12, further comprising:
adjusting the capacitance of the plurality of capacitors by a third increment to vary the operating parameter when the second increment does poi adversely affect the operating parameter.

15. The method of claim 12, wherein the determining comprises:
determining a first and a second magnetic field strength in response to the first and second increments, respectively; and
comparing the first magnetic field strength and the second magnetic field strength to determine whether the second increment adversely affects the operating parameter.

16. The method of claim 12, wherein the adjusting the capacitance by the first increment comprises:
adjusting the capacitance by the first increment to vary a resonant frequency of an inductive coupler.

17. A near field communications (NFC)-enabled device, comprising:
an inductive coupler configured to inductively receive a signal;
a magnetic field sensor configured to sense a magnetic field strength of the signal;
a controller configured to vary an operating parameter of the NFC-enabled device in response to the magnetic field strength using a peak detection process, the controller being further configured to:
change the operating parameter in a plurality of increments until a final increment adversely affects the operating parameter; and
set the operating parameter to an increment immediately before the final increment;
wherein the magnetic field sensor is further configured to generate a sensed field strength signal from the sensed magnetic field strength to cause the controller to vary the operating parameter when the magnetic field strength is less than a threshold.

18. The NFC-enabled device of claim 17, further comprising:
a plurality of capacitors, coupled to the controller, at least one of the plurality of capacitors being configurable to be activated or deactivated by the controller to vary the operating parameter.

19. The NFC-enabled device of claim 18, further comprising:
a plurality of switches, each switch from among the plurality of switches being associated with at least one capacitor from among the plurality of capacitors, wherein the controller is configured to control at least one of the plurality of switches to activate or deactivate its associated at least one capacitor to vary the operating parameter.

20. The NFC-enabled device of claim 18 wherein the plurality of capacitors comprises:
   a fixed capacitor; and
   a plurality of switchable capacitors in parallel with the fixed capacitor.

21. The NFC-enabled device of claim 17, wherein the controller is further configured to vary the operating parameter of the NFC-enabled device to vary a resonant frequency of the inductive coupler.

* * * * *

UNITED STATES PATENT AND TRADEMARK OFFICE
CERTIFICATE OF CORRECTION

| | |
|---|---|
| PATENT NO. | : 8,503,931 B2 |
| APPLICATION NO. | : 13/534888 |
| DATED | : August 6, 2013 |
| INVENTOR(S) | : Robin Wilson |

It is certified that error appears in the above-identified patent and that said Letters Patent is hereby corrected as shown below:

In the Claims

Column 14, Line 23, please replace "poi" with --not--.

Column 15, Line 5, please replace "18 wherein" with --18, wherein--.

Signed and Sealed this
Twenty-seventh Day of May, 2014

Michelle K. Lee
*Deputy Director of the United States Patent and Trademark Office*